United States Patent
Maierholzner

(10) Patent No.: US 7,322,500 B2
(45) Date of Patent: Jan. 29, 2008

(54) HAND TOOL FOR MOTOR VEHICLE

(75) Inventor: Thomas Maierholzner, Vilsbiburg (DE)

(73) Assignee: Seeber AG & Co. KG, Mannheim (DE)

( * ) Notice: Subject to any disclaimer, the term of this patent is extended or adjusted under 35 U.S.C. 154(b) by 521 days.

(21) Appl. No.: 10/725,202

(22) Filed: Dec. 1, 2003

(65) Prior Publication Data

US 2004/0129747 A1 Jul. 8, 2004

(30) Foreign Application Priority Data

Dec. 10, 2002 (DE) ................................ 102 57 747

(51) Int. Cl.
*B60N 3/10* (2006.01)
*A47L 13/02* (2006.01)

(52) U.S. Cl. ....................... 224/486; 224/544; 224/926; 15/236.02

(58) Field of Classification Search ............... 224/544, 224/484, 486, 542, 547, 926; 248/311.2; 296/37.8; 15/236.02
See application file for complete search history.

(56) References Cited

U.S. PATENT DOCUMENTS

| | | | | |
|---|---|---|---|---|
| 3,311,276 A | * | 3/1967 | Fromm .......................... 224/277 |
| 4,040,140 A | * | 8/1977 | Hopkins et al. .......... 15/236.02 |
| 4,300,709 A | * | 11/1981 | Page, Jr. ....................... 224/275 |
| 4,770,712 A | | 9/1988 | Hopkins |
| 4,848,627 A | * | 7/1989 | Maeda et al. ................ 224/275 |
| 4,927,108 A | * | 5/1990 | Blazic et al. ............. 248/311.2 |
| 5,054,668 A | * | 10/1991 | Ricchiuti .................. 224/42.33 |
| 5,099,540 A | * | 3/1992 | Paschetto .................. 15/236.02 |
| 5,129,615 A | | 7/1992 | Strauss |
| 5,381,940 A | * | 1/1995 | Wright ........................ 224/542 |
| 5,509,633 A | | 4/1996 | Ruster et al. |
| 5,865,411 A | * | 2/1999 | Droste et al. ............. 248/311.2 |
| 5,915,832 A | | 6/1999 | Baird, Sr. |
| 6,189,755 B1 | * | 2/2001 | Wakefield .................... 224/542 |
| 6,206,260 B1 | | 3/2001 | Covell et al. |
| 6,708,938 B2 | * | 3/2004 | Bong ........................ 248/311.2 |
| 2002/0038809 A1 | * | 4/2002 | Thibodeau et al. ........ 224/275 |
| 2003/0103345 A1 | * | 6/2003 | Nolan ......................... 362/157 |

FOREIGN PATENT DOCUMENTS

| | | |
|---|---|---|
| DE | 94 20 164 | 5/1996 |
| DE | 196 33 913 | 2/1998 |
| DE | 198 02 897 | 7/1998 |
| DE | 197 52 385 | 5/1999 |
| DE | 299 20 018 | 2/2000 |
| DE | 199 53 502 | 5/2001 |
| EP | 0 492 312 A1 | 7/1992 |
| JP | 07271316 A * | 10/1995 |
| JP | 2001126922 | 4/2001 |
| JP | 2002316572 A * | 10/2002 |
| JP | 2003182439 A * | 7/2003 |

* cited by examiner

*Primary Examiner*—Nathan J. Newhouse
*Assistant Examiner*—Justin M. Larson
(74) *Attorney, Agent, or Firm*—Andrew Wilford

(57) ABSTRACT

A motor-vehicle center console has a wall formed with a recess. A hand tool, for instance an ice scraper, screw driver, bottle opener, or flashlight, is adapted to fit with the recess and is formed with a throughgoing hole. Latches releasably secure the tool in the recess so that for use the hand tool can be grasped through the hole and freed from the recess.

8 Claims, 7 Drawing Sheets

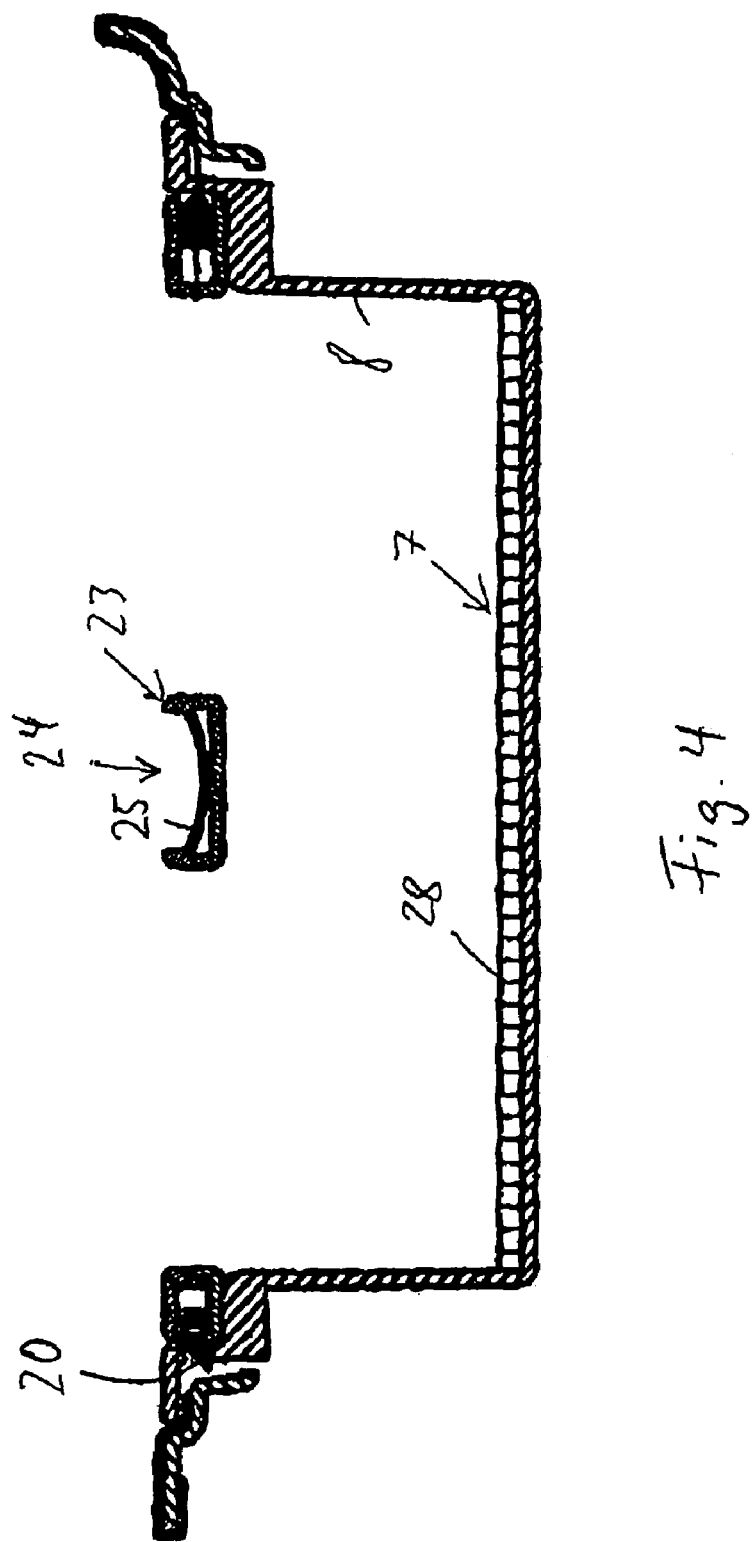

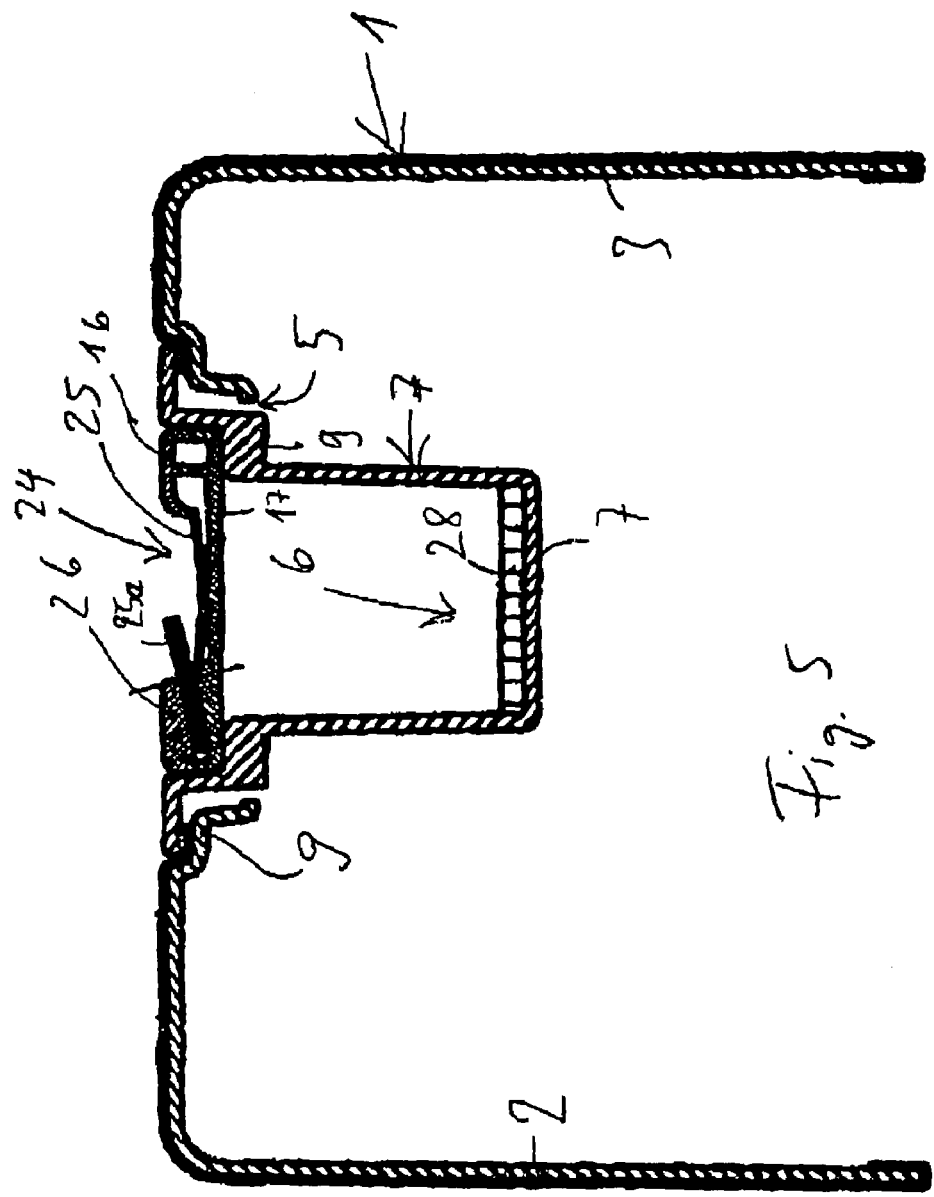

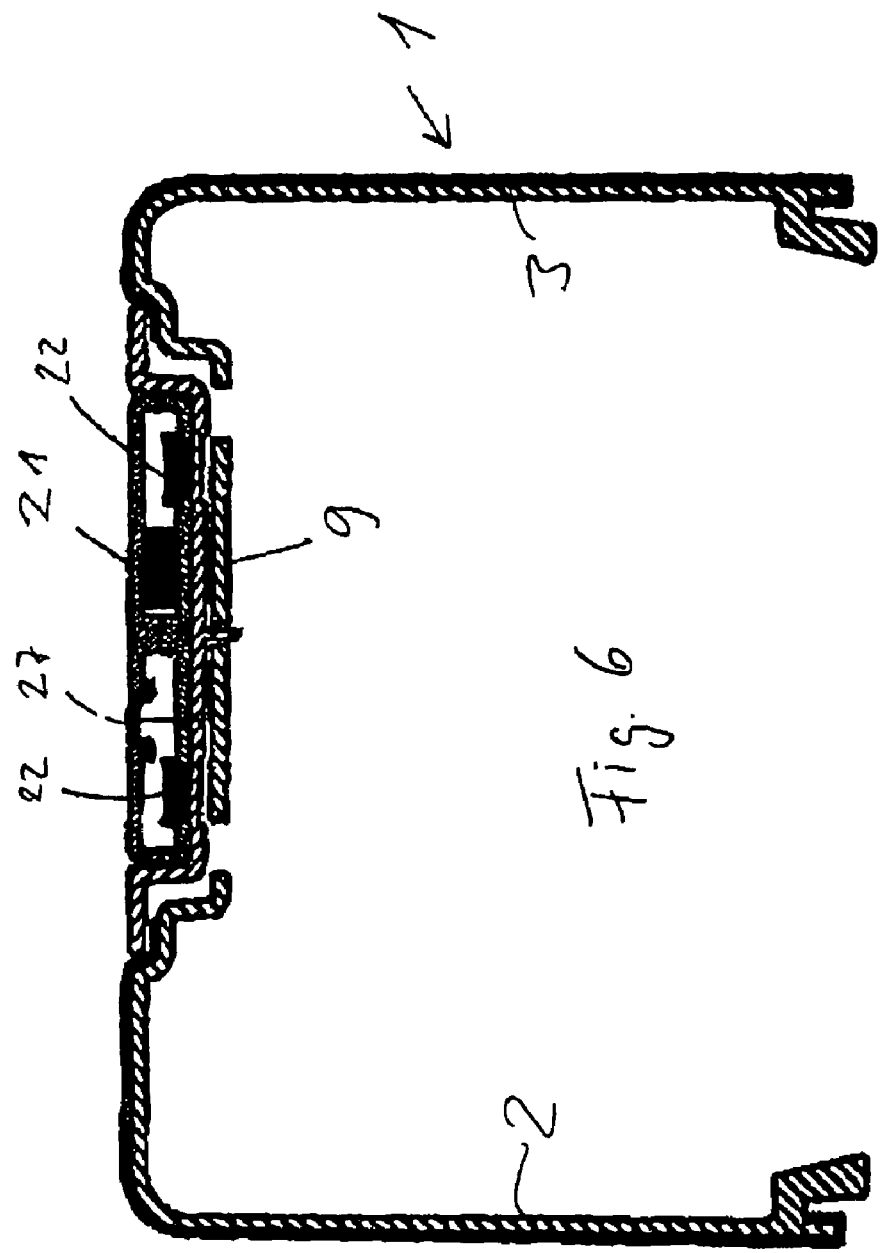

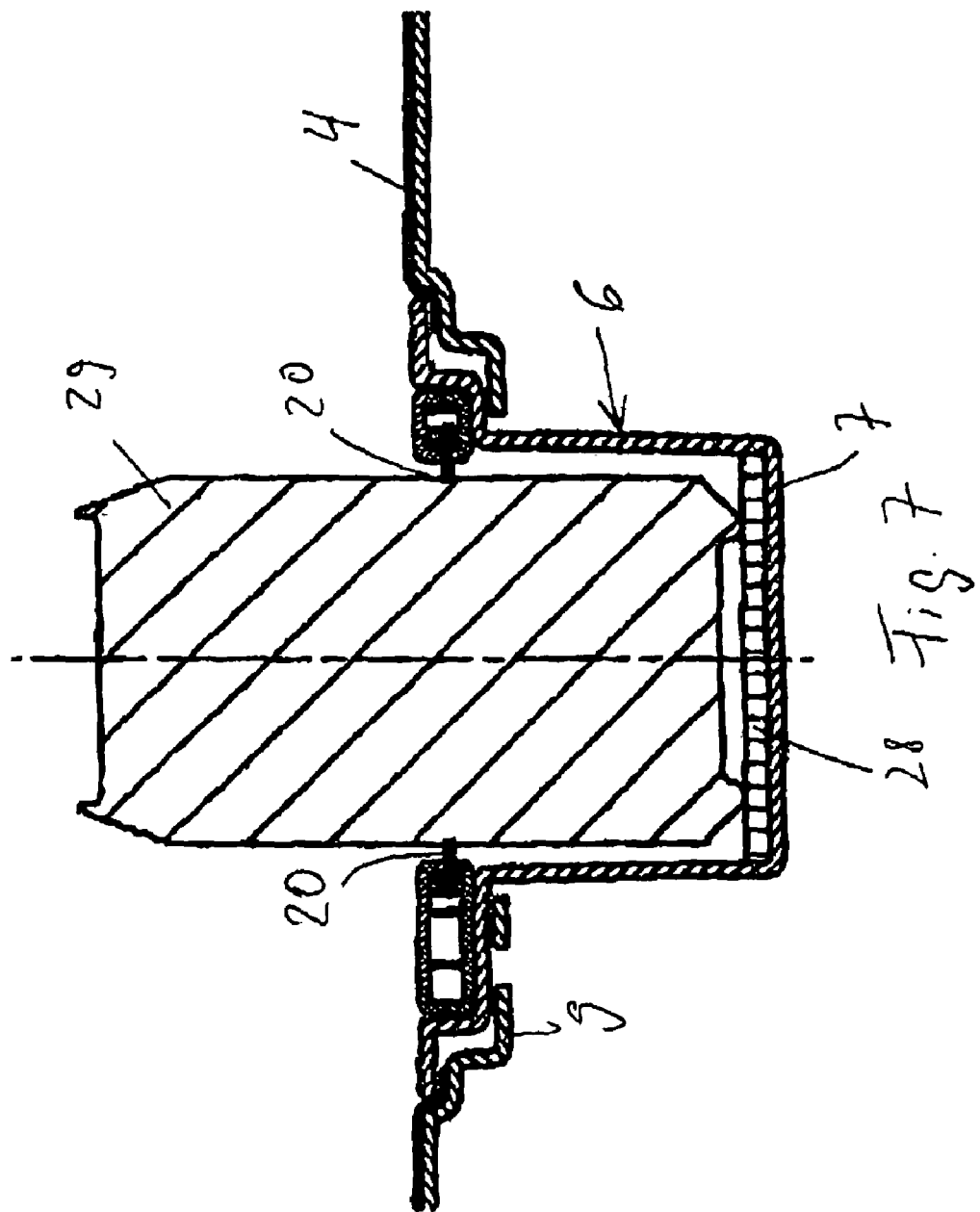

HAND TOOL FOR MOTOR VEHICLE

FIELD OF THE INVENTION

The invention pertains to a tool for use in a vehicle.

BACKGROUND OF THE INVENTION

Vehicles of all kinds (especially those whose passenger area is at least partially enclosed), in particular passenger cars, require a number of small tools or items be available to the driver and passengers. These are items not necessarily directly related to the motion of the vehicle. For instance, these items might be used only in specific situations or might make the ride more comfortable for the driver.

OBJECT OF THE INVENTION

It is the task of this invention to provide a possibility of accommodating such hand tools in a simple manner.

SUMMARY OF THE INVENTION

In accordance with the invention, for a vehicle of the type described above this task is solved such that the hand tool is a hand tool attached in a removable manner to a partition or wall of the vehicle by means of a fastener.

With this arrangement of the hand tool, the driver or vehicle occupant can quickly grasp the hand tool; on the other hand, the hand tool has a fixed place. This considerably reduces the risk of mislaying the hand tool, compared to a hand tool which cannot be fastened in the vehicle. Also, in this manner the vehicle can be tidied up quickly. The users of the vehicle can quickly become used to the notion that the hand tool has a fixed place; hence, they can grasp it at any time when needed, without having to search for it.

A hand tool is especially appropriate which is located in or above a recess or indentation in the wall. In this manner, the hand tool hides a storage space in which further objects can be accommodated.

The tool can be attached permanently while being easily and quickly removable if it is affixed to the wall by means of a snap-on connection or by means of magnetic elements.

It is advantageous to place the hand tool in the area of the center console of a vehicle. Objects that the driver occasionally requires during the ride can be located in a recess or indentation in the center console.

The hand tool can be attached optically inconspicuously or not at all visibly if the hand tool has tabs or snap-on notches on a side wall or on a side facing the recess, and if these tabs or snap-on notches interact with snap-on notches or snap-on recesses at the recess.

If the hand tool is provided with at least one opening for handling, then the hand tool can be grasped easily, without requiring the user to remove the hand tool from its fastener by means of focused pressure.

It is advantageous to design the opening for handling such that its diameter corresponds at least partially to the diameter of a cup—especially for a beverage, a common beverage bottle, a beverage can, or similar object. As an alternative, the opening for handling has a larger diameter. This makes it possible to grasp next to a beverage can or beverage bottle placed in the opening for handling. The opening for handling has either a circular or elliptical contour. Any other shape for the opening for handling is also imaginable.

The opening for handling is provided with a partial lip made of elastic material, or a lip made of such material that runs around the entire circumference. This lip ensures that an object (especially a beverage) can be held tightly and without making noise.

A further possibility for easing grasping of the hand tool is for it to have an indentation on its outer lateral contour, by means of which the hand tool can be grasped.

This invention deals in particular with a tool that is an ice scraper, a screwdriver, a bottle opener, or similar object. Also, a light fixture (in particular a light-emitting diode and/or a coin holder) can be provided on the hand tool.

Such a tool can be used around the vehicle, or a passenger can use it there for his or her own purposes, such as in order to open a bottle or can.

A hand tool is advantageous that is provided with a first lip protruding from its outer lateral contour. This first lip is made of hard plastic, with a sharp outer edge. During frost conditions, this lip is used to remove ice from the window panes of the vehicle. Additionally or as an alternative, a lip made of a rubbery-elastic material is used which is suitable for removing moisture from the window panes.

This second lip is placed, for instance, on the opposing narrow side of the hand tool, or above or below the first lip.

The first lip is provided with corrugations, especially on one side, in order to scrape ice or snow from the outer side of a pane of the vehicle in a corrugated pattern.

As an alternative or additionally, a snow brush can be included. It can be placed, for example, on the narrow side of the tool opposite to the lip.

As an alternative or additionally, it is advantageous to provide the tool with a notch, for instance approximately in the middle of its externally accessible surface. This notch can serve to hold a coin or bottle opener.

An advantageous design is to have the hand tool consist of two flat elements which are joined together and cannot be taken apart. By appropriately shaping the contour of the elements in the region where they join, any desired tools can be placed between these two elements. The tools protrude from the hand tool.

In a variant, the hand tool is provided with at least one lip and/or plate placed between these elements and protruding laterally outward.

A hand tool is especially appropriate with which a battery or rechargeable battery and a light fixture are placed between the elements. This way, the hand tool can serve as an orientation aid in the darkness; it itself can be found easily, because it has a fixed location and can always be found again. If the batteries snap into the hand tool from its underside, then they can be removed and replaced when they are discharged. Rechargeable batteries accessible from the underside via contact surfaces can be recharged via them by placement in a charger, if the rechargeable batteries cannot be removed from the hand tool.

BRIEF DESCRIPTION OF THE DRAWING

The above and other objects, features, and advantages of the invention will become more readily apparent from the following description, reference being made to the accompanying drawing in which:

FIG. 4 is a section along line IV-IV from FIG. 1,
FIG. 5 is a section along line V-V from FIG. 1,
FIG. 6 is a section along line VI-VI from FIG. 1,
and
FIG. 7 is a section along line VII-VII from FIG. 1.

SPECIFIC DESCRIPTION

Figure 1:
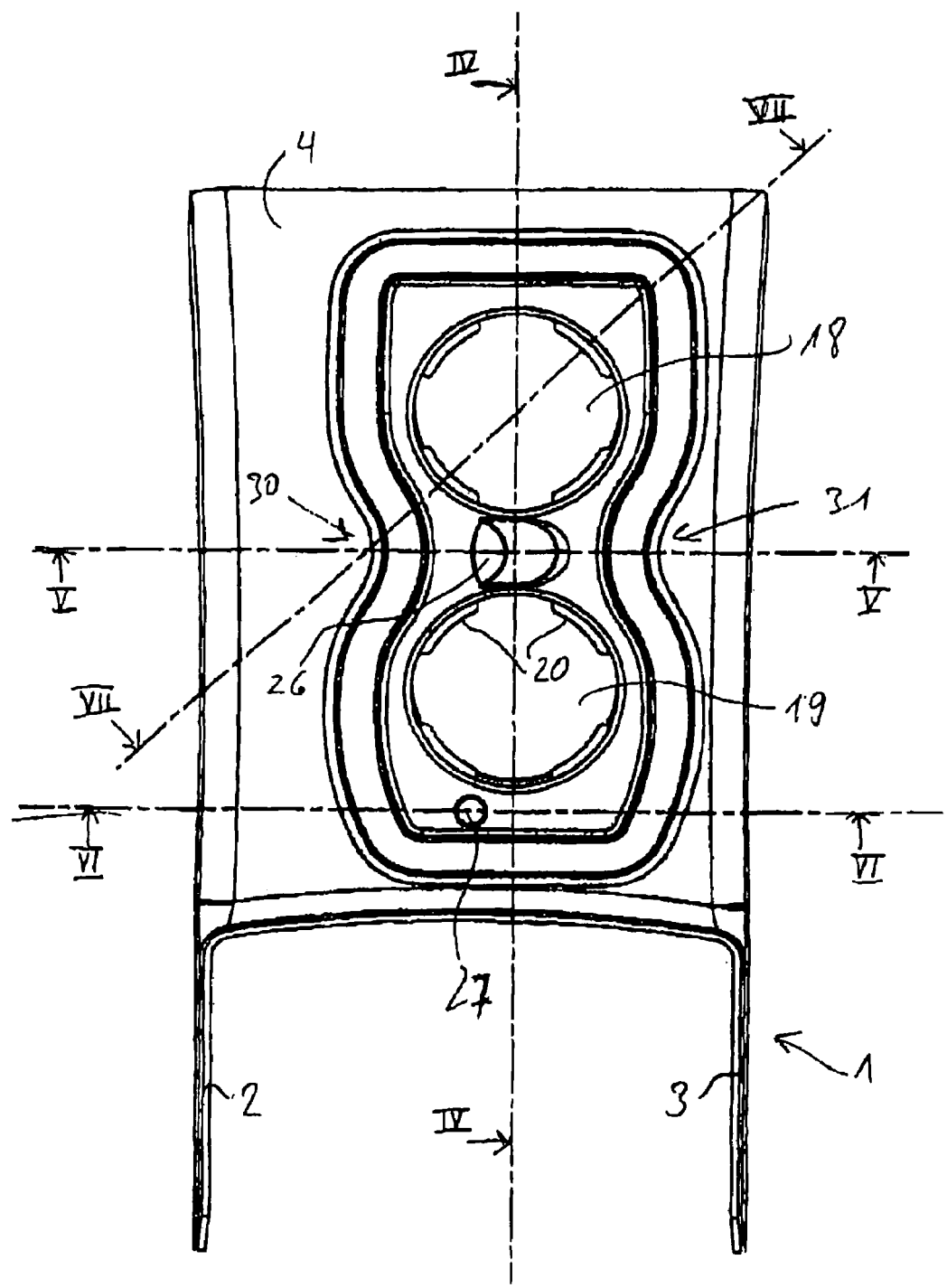
FIG. 1 is a top view of the center console of a motor vehicle, equipped with a recess and a hand tool covering the recess.

A carrier 1 (FIG. 1) for a center console is arranged in a passenger car between the driver's seat and the front passenger's seat. It extends in the direction of travel. The rear part of the carrier 1 has only side walls 2 and 3 that can be placed on another component not shown here, such as an arm rest.

The front part of the carrier 1 has a cover 4 (FIG. 3) with an opening 5 (FIG. 3) for receiving a tub-shaped insert 6. The insert 6 has a bottom 7 (FIG. 4) extending in the longitudinal direction of the center console. Both of its sides are narrow in the middle. The insert 6 also has a wall 8 (FIG. 4) running upward, essentially vertically or sloped slightly outward. A lateral rim 10 is connected to the wall 8 via a ledge 9 (FIGS. 3-7). The rim 10 protrudes beyond the cover 4, while the ledge 9 lies on a surface 11 recessed in the cover 4.

In order to ensure that the user cannot sever the connection between the insert 6 and the carrier 1 of the center console, the underside of insert 6 is provided with latches 12. When the insert 6 is inserted into the carrier 1, these latches 12 snap into corresponding notches 13.

Figure 2:
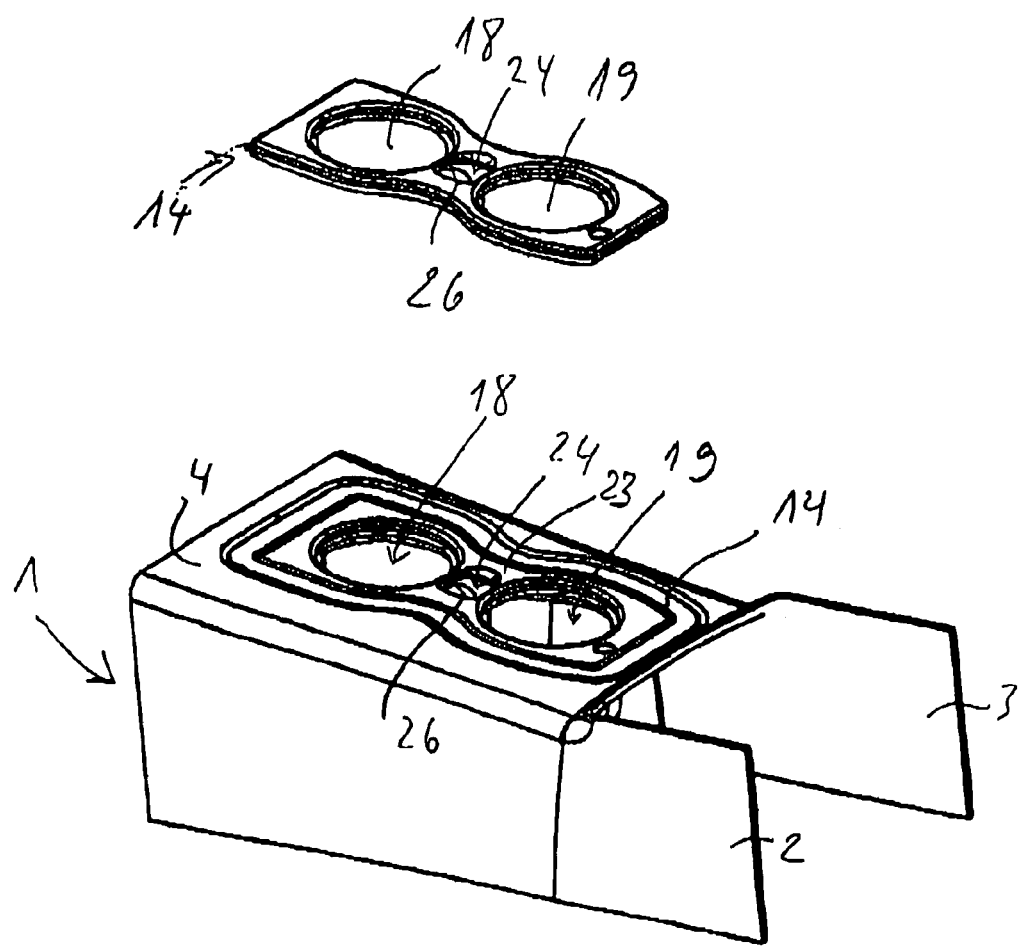
FIG. 2 is a perspective drawing of the center console in accordance with FIG. 1, with the hand tool removed.
Figure 3:
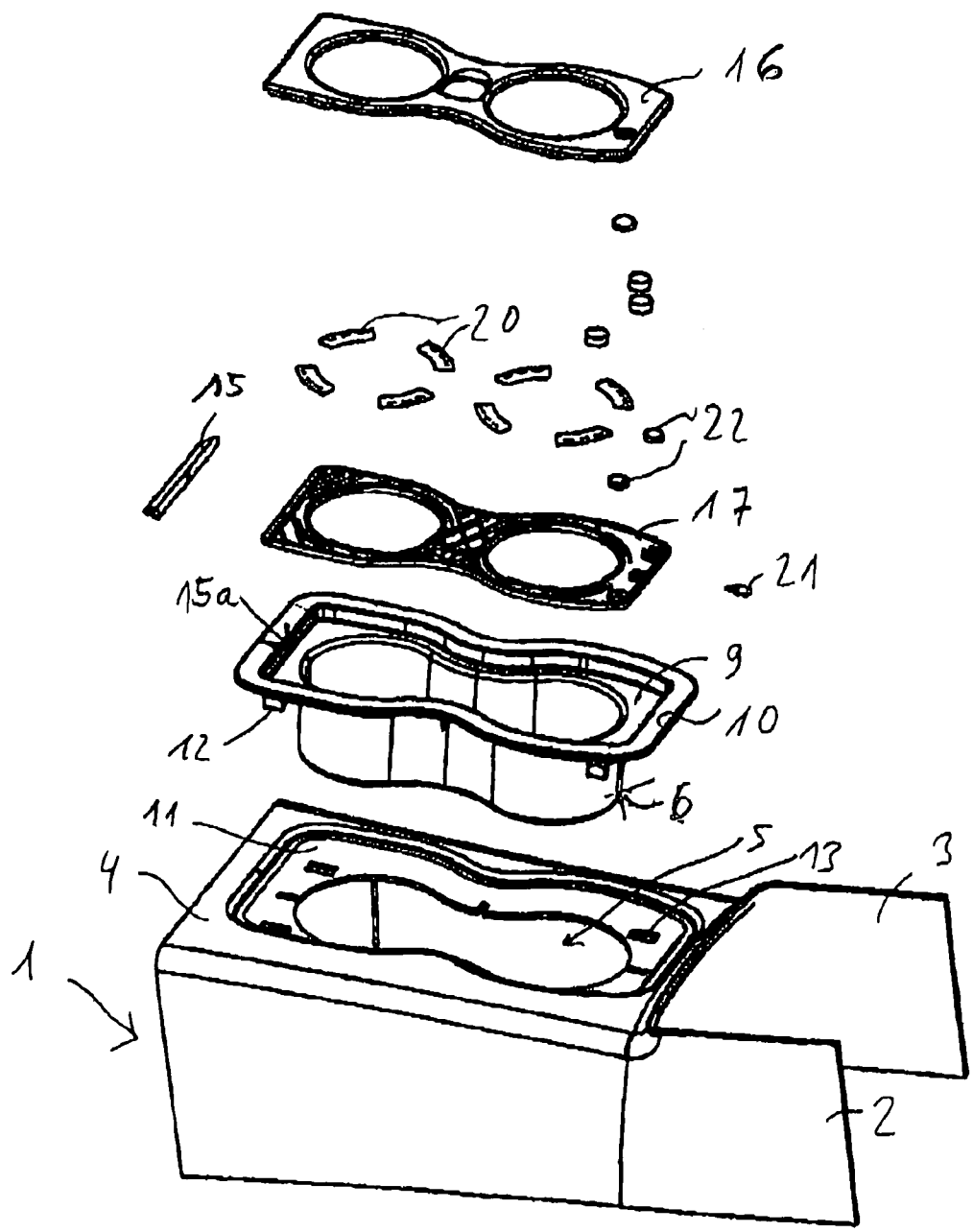
FIG. 3 is an isometric exploded view with the individual parts shown separately.

A hand tool 14 (FIG. 2) shaped essentially like the bottom 7 lies on the ledge 9. The hand tool 14 is connected with the insert 6, preferably by means of a fastener. A lug 15 (FIG. 3) on a narrow side of the hand tool 14, is used as the fastener. In the wall of the insert 6 above the ledge 9 and the rim 10, there is a depression 15*a* which forms an undercut. The lug 15 locks into this depression 15*a*.

On the narrow side across from the lug 15 or near this side, the hand tool 14 also is provided with notches or similar items. They can be pulled out of their locked-in position or inserted, by means of pressure (for instance when the hand tool 14 is pulled out). Hence the hand tool 14 is fastened to the ledge 9 and cannot be lost, since it is held in the depression 15*a* and by the notches.

As an alternative, a snap-together joint or a number of snap-together joints can be included that are arranged in the area of the edge of hand tool 14 and which elastically give way when the hand tool 14 is pulled out.

As an alternative to the snap-together joints for fastening the hand tool 14 on the ledge 9, magnetic elements can be placed on the lower part 17; they are attracted by related magnetic elements in particular in the area of the ledge 9.

For appearance reasons, the magnetic elements are arranged between an upper part 16 and a lower part 17 such that they are externally invisible. Similarly, the related, permanently mounted magnetic elements in the area of the center console can be placed such that they are externally invisible.

Since the hand tool 14 can be removed from the insert 6, objects such as a cell phone, a pack of cigarettes or a eyeglasses case can be placed inside.

The hand tool 14 consists of the upper part 16 and the lower part 17, which are basically structured in an identical manner. They are preferably made of hard plastic, such as polypropylene, or they are made of metal. The lower part 17 can be made of a different kind of material than the upper part 16.

The upper part 16 and the lower part 17 are both formed with throughgoing openings 18 and 19 for inserting beverage cans, beverage bottles and drinking vessels. Lips 20 protruding into the openings 18 and 19 consist of elastic material, such as rubber. They make it possible to securely hold the object inserted in one of the openings 18 or 19 without vibration, and they suppress noise between the object and insert 6 as well as the hand tool 14.

It is advantageous for the lug 15 to be formed as a hard rubber lip that can be used as an ice scraper. In one version, the lug 15 is placed between the lower part 17 and the upper part 16 such that it can be removed by lateral sliding whenever it is to be replaced by an element for ice scraping. Corrugations (not shown here) can be placed on the underside of the device 14, in particular near one of the narrow sides for scraping ice when very hard ice adheres to a window pane of the vehicle. Also, a soft lip can be placed on the narrow side of hand tool 14 opposite to the lug 15.

A light-emitting diode 21 is provided on the side opposite to the lug 15 and is supplied with electrical power by batteries 22 in the form of button cells. The batteries 22 either last the entire useful life of the light-emitting diode 21, so upper part 16 and lower part 17 can be joined inseparably during manufacture. Alternately these two elements can be joined by means of separable snap-together joints in such a manner that the batteries 22, which can be rechargeable, can be replaced. The light-emitting diode 21 is operated by means of operating button 27 (FIG. 6) placed on the surface of the upper part 16 near the narrow side.

If the undersides of the batteries 22 are flush with the lower surface of hand tool 14, they can be removed from below.

Between the openings 18 and 19, the hand tool 14 is provided with a ridge 23 (FIG. 4) in which a depression 24 is formed. A spring 25 (preferably blade-shaped) is located at the bottom of the depression 24. An object can be placed in the depression, in particular a flat, round object such as a coin or a token 25*a* for a shopping cart. The spring presses this object against a lateral lug 26 that prevents the object from springing out due to the vehicle's vibration. Instead of the spring 25, the upper part 16 of the hand tool 14 can have a depression for accepting the coin or several coins. The lug 26 can be crescent shaped, for example, and can be formed and serve as a bottle opener.

Various tools can be placed in the area of the lateral edges or on a surface of the device 14 formed by the lower part 16 or the upper part 17. These tools can be arranged in a manner allowing them to be unfolded, like for common multifunction tools. The hand tool 14 is provided with cutouts 30 and 31 in the middle of its long sides. With the recessed shape, it can be easily held in one hand.

An elastic cushion pad 28 FIG. 7) is provided on the bottom 7 of the insert 6. Thus, a beverage can 29 laterally supported by the lips 20 is held elastically and does not cause noise even when the vehicle vibrates.

Of course, a hand tool 14 as described using a center console can be placed at other locations in a vehicle.

I claim:

1. In a motor vehicle, the combination comprising:
   a wall formed with a recess;
   a hand tool adapted to fit with the recess, formed with a throughgoing hole and of a pair of similarly shaped secured-together elements, and including a scraper blade fastened between and projecting at an end from between the elements, the throughgoing hole being generally circular, at least as large as a standard beverage can, and having elastically deformable lips adapted to grip a standard beverage can fitted in the hole; and latch means for releasably securing the tool in the recess, whereby for use the hand tool, which can form part of a cup holder, can be grasped through the hole and freed from the recess.

2. The combination defined in claim 1 wherein the hand tool is an ice scraper.

3. The combination defined in claim 1 wherein the vehicle has a center console forming the wall.

4. The combination defined in claim 1 wherein the latch means includes a magnet.

5. The combination defined in claim 1 wherein the tool is provided with a hard edge suitable for use as a scraper.

6. The combination defined in claim 1 wherein the tool is elongated and has long sides formed with cutouts facilitating gripping of the tool.

7. The combination defined in claim 1 wherein the tool is formed with a seat shaped to releasably retain a coin.

8. The combination defined in claim 1, further comprising
a light source fixed on the tool; and
a battery between the elements connectable to the source.

* * * * *